June 5, 1956 H. S. WOODWARD 2,748,787
NON-EXPLODABLE GASOLINE TANK AND OUTLET
Filed Sept. 15, 1952 6 Sheets-Sheet 1

INVENTOR,
Harold S. Woodward,
BY
E. O. Vrooman & Co.,
ATTORNEYS.

June 5, 1956 H. S. WOODWARD 2,748,787

NON-EXPLODABLE GASOLINE TANK AND OUTLET

Filed Sept. 15, 1952 6 Sheets-Sheet 2

INVENTOR,
Harold S. Woodward.
BY
E. E. Vrooman & Co.,
ATTORNEYS.

June 5, 1956 H. S. WOODWARD 2,748,787

NON-EXPLODABLE GASOLINE TANK AND OUTLET

Filed Sept. 15, 1952 6 Sheets-Sheet 3

INVENTOR,
Harold S. Woodward.
BY
E. O. Vrooman & Co.,
ATTORNEYS.

June 5, 1956 H. S. WOODWARD 2,748,787

NON-EXPLODABLE GASOLINE TANK AND OUTLET

Filed Sept. 15, 1952 6 Sheets-Sheet 4

INVENTOR,
Harold S. Woodward.
BY
E. E. Vrooman & Co.,
ATTORNEYS.

INVENTOR,
Harold S. Woodward,
BY
E. C. Vroomon & Co.,
ATTORNEYS.

NON-EXPLODABLE GASOLINE TANK AND OUTLET

Filed Sept. 15, 1952 6 Sheets-Sheet 6

INVENTOR,
Harold S. Woodward.
BY
E. E. Vrooman & Co.,
ATTORNEYS.

United States Patent Office 2,748,787

Patented June 5, 1956

2,748,787

NON-EXPLODABLE GASOLINE TANK AND OUTLET

Harold S. Woodward, Los Angeles, Calif.

Application September 15, 1952, Serial No. 309,585

6 Claims. (Cl. 137—39)

This invention relates to non-explosable gasoline tank and outlet.

More particularly the invention relates to means for automatically closing the outlet of a tank containing gasoline or other highly explosive liquid.

One object of this invention is to provide a novel outlet construction wherein the outlet will remain free and open to convey the liquid from the tank to any desired point of delivery and wherein the outlet will be automatically closed upon any accident occuring to the automobile carrying the invention.

A second important object of the invention is to provide a novel closure which effectively shuts off the flow through a delivery pipe carried by a tank prior to the flow reaching the point of connection of the device to a conducting pipe leading to the engine or other point of use.

A third important object of the invention is to provide a device of this character having novel means for closing the delivery pipe leading from a tank and novel means for holding the closure open under running conditions.

A further important object of the invention is to provide a device of this character having a valve normally held open during running conditions and novel means for automatically closing such a valve upon the device being subject to a shock by accident.

A fifth important object of the invention is to provide novel means for so regulating the closing of such a valve that the minor shocks, due to application of the vehicle brakes or the like, will have no effect on the flow cut-off means.

A sixth important object of the invention is to provide a novel tank construction highly resistant to collapse or bursting.

A seventh important object of the invention is to provide an airplane with a type of tank that will not burst in event it crashes, thus preventing an explosion and thereby preventing major fires, which should save some lives and property.

The invention consists in general of certain novel details of construction and combinations of parts hereinafter fully described, illustrated in the accompanying drawings, and particularly claimed.

In the accompanying drawings, like characters of reference indicate like parts, and:

Figures 4, 5, 14, 15, 16:
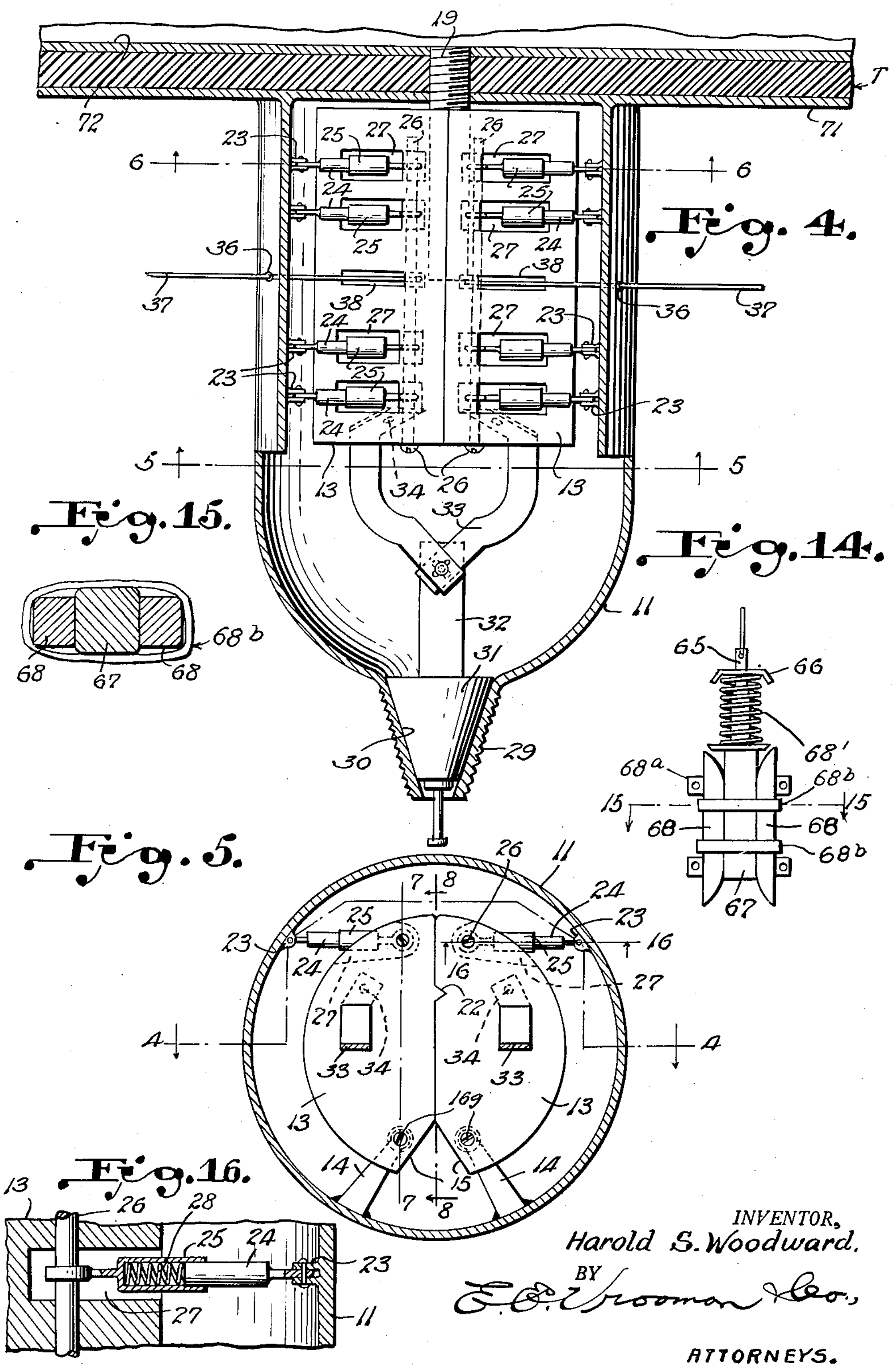
Fig. 4 is an enlarged detailed section of a portion of the tank and the out-flow control, the section being taken on the line 4—4 of Fig. 5.
Fig. 5 is a section on the line 5—5 of Fig. 4.
Fig. 14 is an enlarged detailed view showing a friction device for controlling the extent of shock necessary to operate this invention.
Fig. 15 is an enlarged section on the line 15—15 of Fig. 14.
Fig. 16 is a greatly enlarged fragmentary section on the line 16—16 of Fig. 5.
Figure 7:
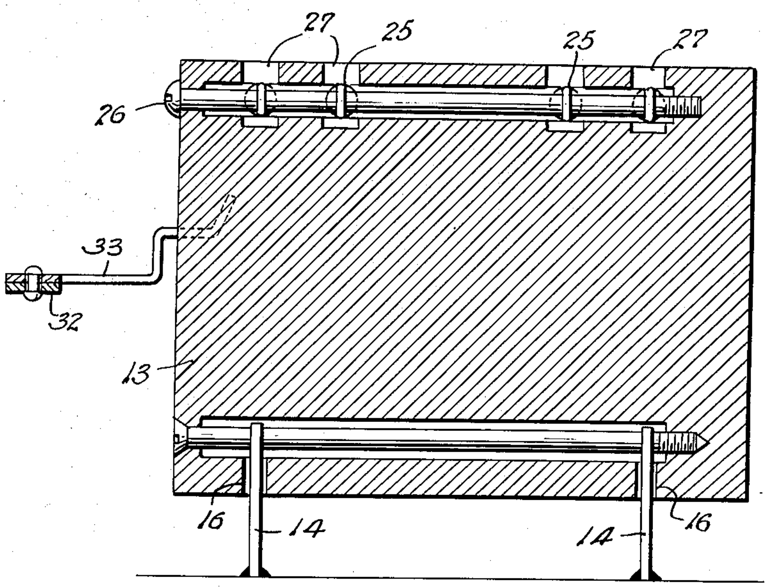
Fig. 7 is a fragmentary section on the line 7—7 of Fig. 5.

In a form of the invention shown in the present drawings, there is provided a tank T. From this tank there extends a pipe 10 and surrounding and enclosing this pipe is a housing 11, firmly fixed to the tank T. The pipe 10 is provided with longitudinally spaced circumferential ribs, preferably of V-shape as shown at 12. Within the housing 11 there is provided a pair of relatively heavy jaws 13 which are pivoted to the free ends of arms 14 solidly connected to the housing and projecting inwardly therefrom. The jaws 13 are of general semi-circular cross-section but have their adjacent lower edges beveled as at 15, and adjacent these beveled portions are pockets 16 into which the arms 14 extend, pivot bolts 16*a* extending through the arms 14 at their pocketed ends. The jaws 13 are provided axially with semi-circular grooves 13*a* and the said grooves are provided with internal V-shaped enlargements 17 adapted to receive the ribs 12 of the pipe. The pipe has at one end a flange 18 adapted to fit in the grooves 20 of the jaws 13. The other end of this pipe is threaded as at 19 for engagement in the wall of the tank as best shown in Fig. 4. Also, one of the jaws 13 is provided with a set of ribs 21 of general J-shape and a further rib 21 extending vertically of the jaw. The other jaw 13 is provided with cooperating grooves 22, to receive the ribs 21 when the flat faces of the jaws are brought together.

Figure 6:
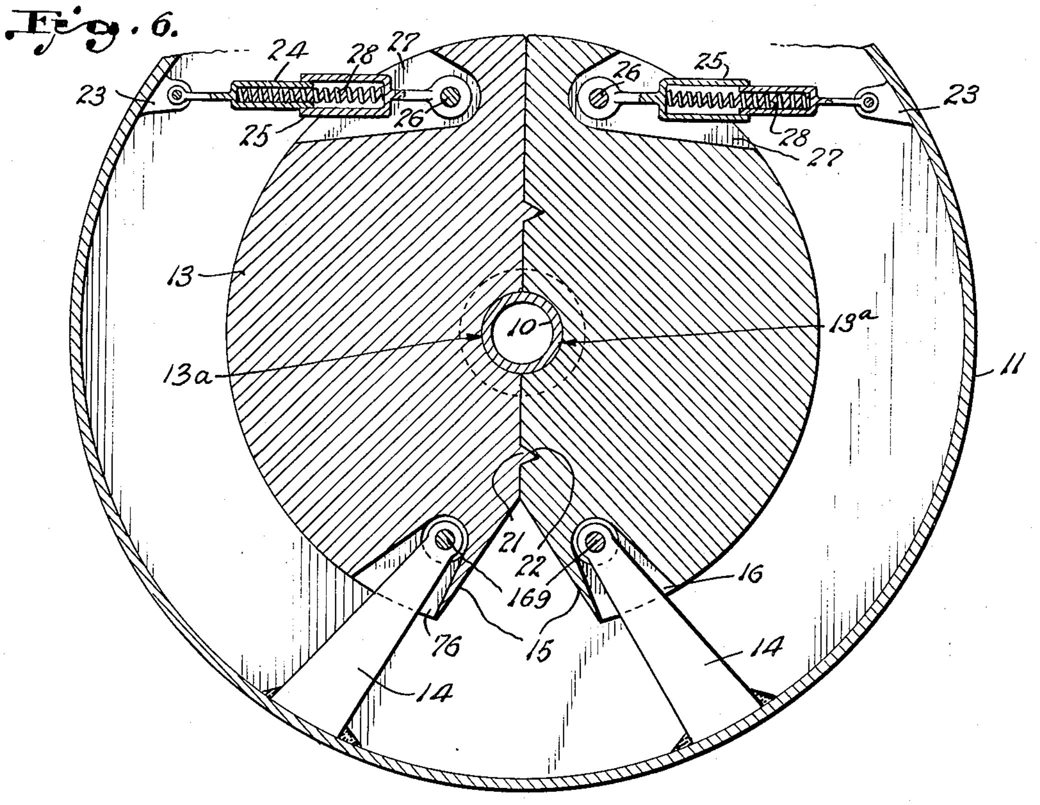
Fig. 6 is a further enlarged view on the line 6—6 of Fig. 4.
Figures 8, 9, 10:
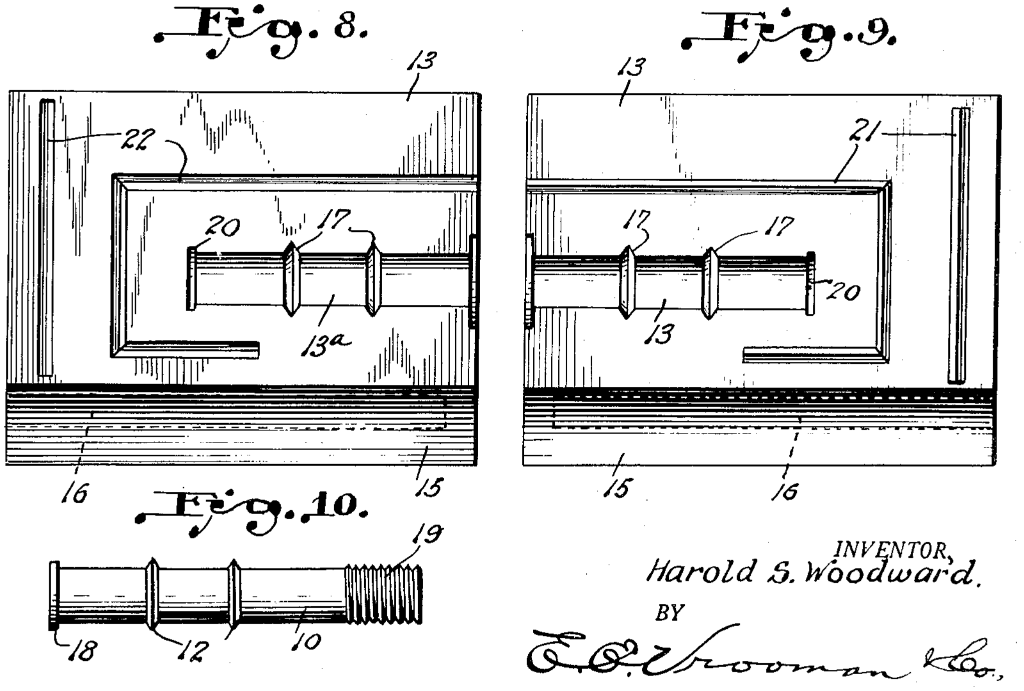
Fig. 8 is a detailed section on the line 8—8 of Fig. 5 and looking in the direction of the arrows.
Fig. 9 is a detailed section similar to Fig. 8 on the line 8—8 of Fig. 5, but looking in the direction opposite the arrows.
Fig. 10 is a detailed side view of outlet tube used in connection herewith.
Figures 18, 19, 20, 21:
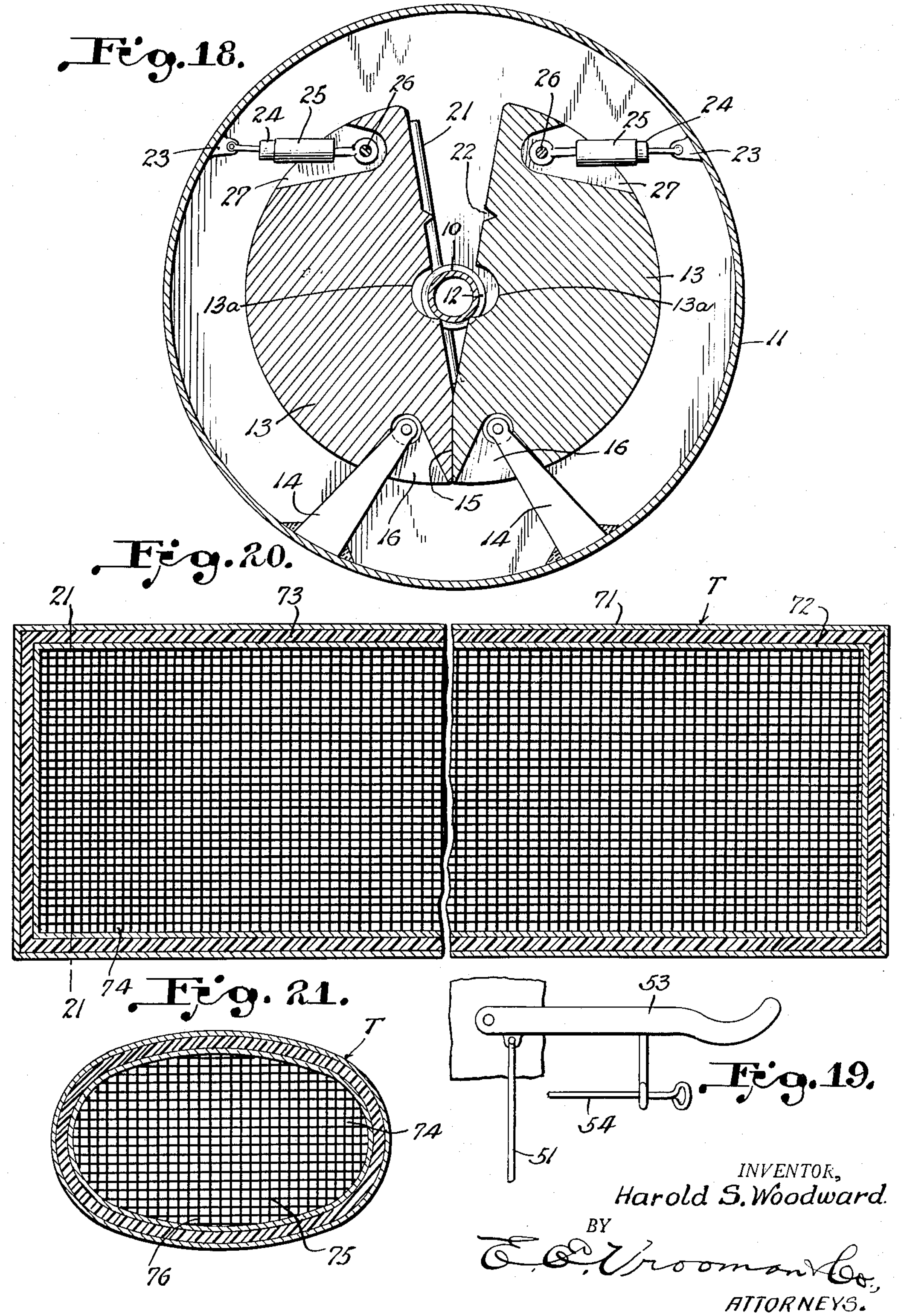
Fig. 18 is a view similar to Fig. 6 but showing the shock closing means in open position.
Fig. 19 is a fragmentary view of a locking device used herewith.
Fig. 20 is a horizontal longitudinal section through the center of a tank adapted to be used herein.
Fig. 21 is a section on the line 21—21 of Fig. 20.

As shown in Fig. 18, the normal or running position of the jaws 23 is such that their beveled portions 15 contact and the main portions of the jaws are spread apart from the pipe 10. Due to the weight of the jaws 23 each has a very considerable inertia of rest. Since this device is particularly for use in connection with automobile or other like vehicles, this property of inertia of rest in the jaws prevents slight vibrations from causing the jaws to close on the pipe as shown in Fig. 6. It is here to be noted that when the jaws grasp the pipe and close fully, the flange end 20 of the pipe will be closed. Furthermore, if any gasoline or other explosive fluid leaks from the pipe 20 into the space between the jaws, its outward flow will be prevented by the engagement of the ribs 21 and grooves 22 and the engagement of the ribs 12 and the grooves 17.

As will be seen from the references, the jaws have a very considerable mass or weight and in order to overcome some of the effect of this mass so that the proper closing of the jaws is not inhibited, spring means are provided. Within the housing 11 at the upper part thereof, there is provided on each side of the jaws a set of pivot lugs 23. To each of the pivot lugs 13 there is pivoted an inner spring seat 24, arranged to telescope within an outer spring seat 25, and these outer spring seats 25 are pivoted on bolts 26 extending longitudinally of the jaws, pockets 27 being provided in the jaws for reception of the pivot attachment to the bolts 26 and for the adjacent portions of the spring seats 25. Mounted within each pair of spring seats 24 and 25 is a coiled compression spring 28 having just sufficient strength to close the jaws 13 on the pipe 10 if a sudden shock occurs to the tank, such a shock as might occur on a vehicle colliding with some object or rolling over, or the like.

It will be noted that the housing is normally spaced for a considerable distance around the pipe and jaws so that as liquid flows out of the pipe 10, it will tend to fill the space within the housing not occupied by the moving parts. Arranged axially of the pipe 10, the housing is provided with a pipe threaded outlet 29 having a frusto-conical bore 30 constituting a valve seat. Cooperating with this valve seat is a frusto-conical valve member 31, having a stem 32. Pivoted to this stem is a pair of links 33 which diverge from the pivot and have their free end pivoted at 34 to respective jaws. When the jaws are in open position the pivot ends will be spread apart and due to this spreading apart the valve member 31 will be raised from the valve seat, thus permitting the gasoline or other liquid to flow freely from the housing so that it may be conducted to any desired point as by a pipe 35.

Figure 1:
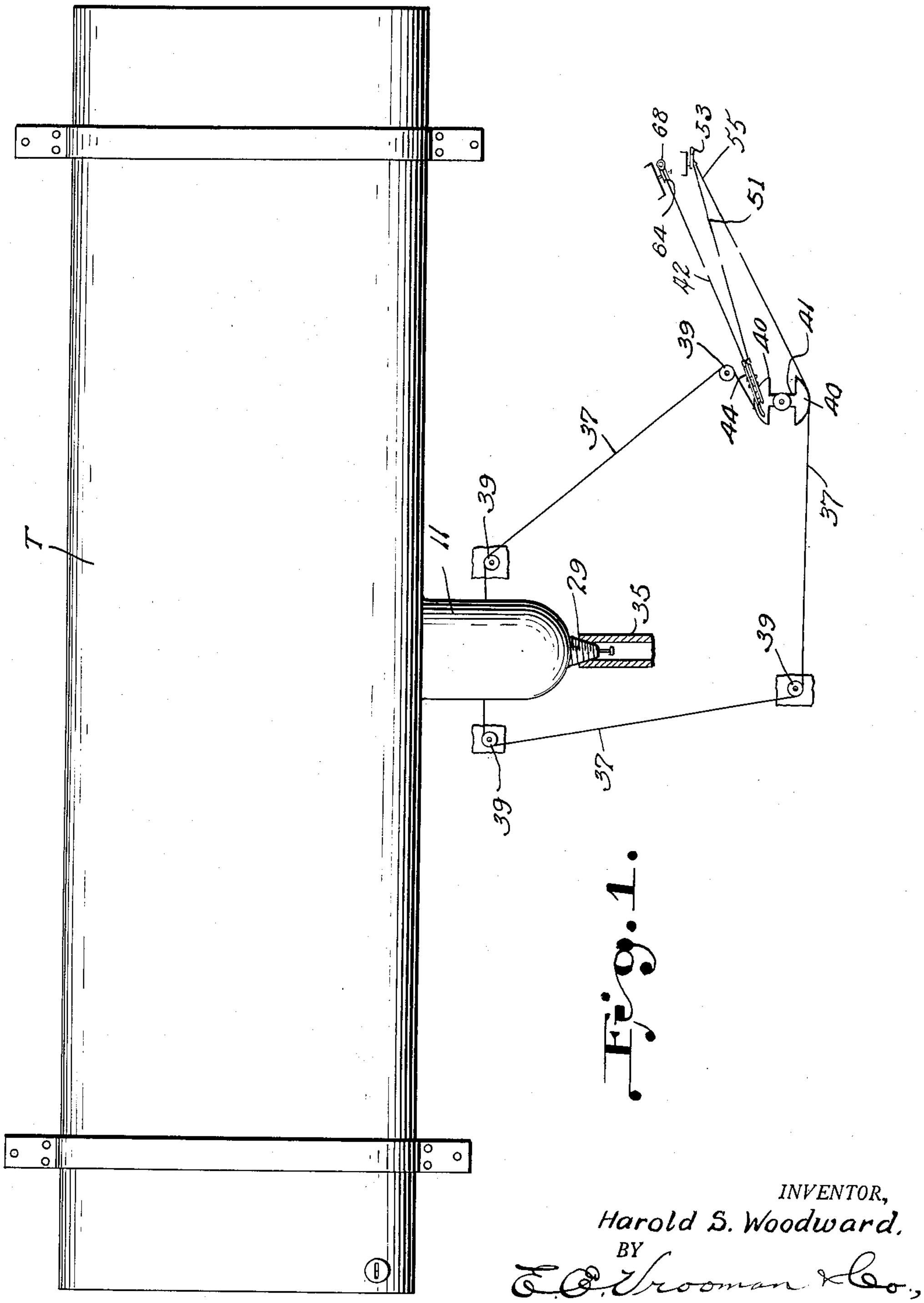
Fig. 1 is a top plan view of a tank, the housing containing the automatically cut-off means and the means normally holding the cut-off means open.
Figures 2, 3, 11:
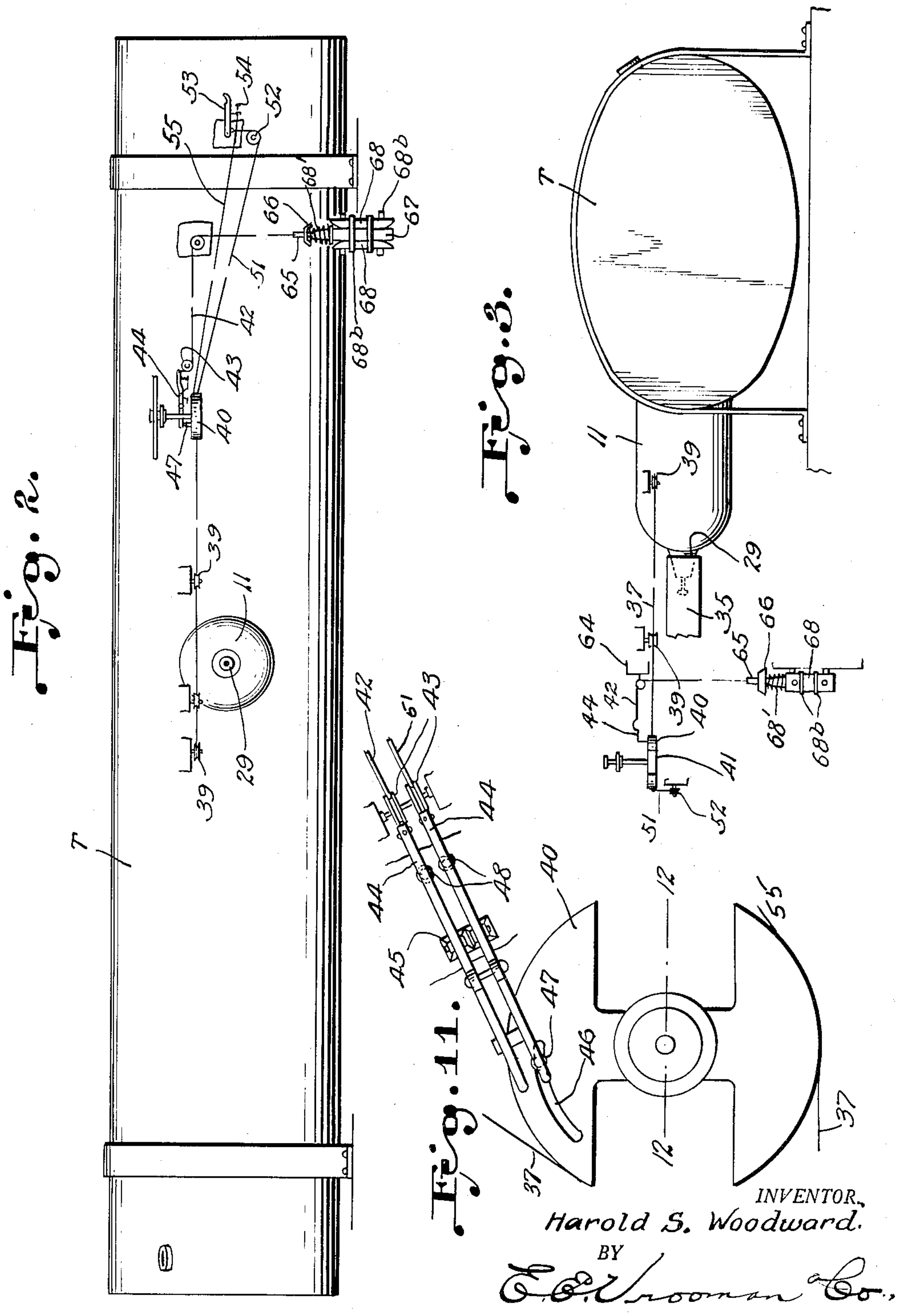
Fig. 2 is a side elevation of the parts shown in Fig. 1.
Fig. 3 is an end elevation of the device taken from the right hand end of Fig. 2.
Fig. 11 is a detail of a certain rocker element used herein together with controlling levers therefor.
Figures 12, 13, 17:
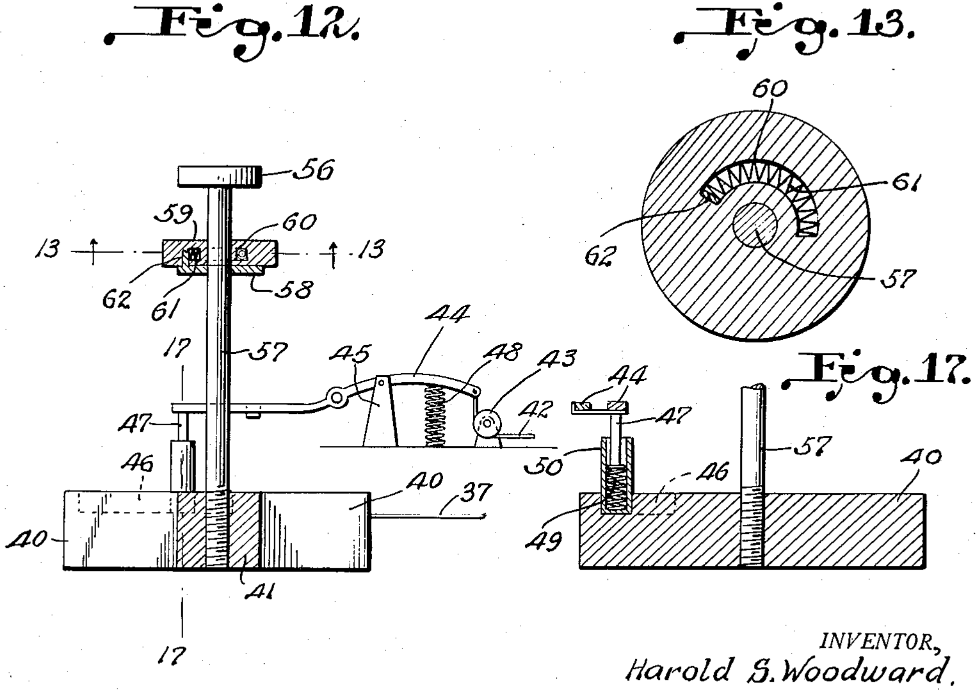
Fig. 12 is a vertical section taken through the axis of the rocker elements shown in Fig. 11, the section being substantially on the line 12—12 of said figure.
Fig. 13 is an enlarged section on the line 13—13 of Fig. 12.
Fig. 17 is a detailed section on the line 17—17 of Fig. 12.

Obviously some means must be provided for reopening the pipe 10 by causing the jaws 13 to resume the position shown in Fig. 18. To that end the housing 11 is provided with oppositely disposed openings 36, through which pass flexible strands 37, preferably in the form of wire or cable. The ends of these strands within the housing pass through the openings 36 and into pockets 38, through which pass bolts 26, being secured to said bolts within said pockets. One of the strands 37 passes over idler pulleys 39 and has its end secured to one of a pair of arcuate members 40, which are connected by a cross-bar 41. The other member 37 likewise runs over idlers 39 and connects to the opposite portion 40. Also attached to the arcuate sides of the two members 40, are respective strands 42 and 51 which lead over idler pulleys 43 and have their free ends connected to interconnected treadle levers 44 pivoted intermediate their ends on a bracket 45. As seen in Fig. 3, strands 42 lie directly beneath strand 37, but are shown as offset for clarity of illustration. The ends of these levers, remote from the points of attachment of the strands 42 and 51, overlie one of the portions 40. This portion 40 has an arcuate slot 46 and one of said levers 44 carries a pin 47, which enters in this slot. The levers 44 are normally held in a position shown in Fig. 12 by means of springs 48. A spring 49 urges the pin 47 upward, the spring 49 being housed in a spring guide 50. Connected to one of the members 40 is a strand 51, which runs under an idler 52 and up to a latching lever 53, provided with a latch pin 54, which is connected by a strand 55 to the other member 40.

Journalled in a bracket 56 is a shaft 57, which has its lower end fixed in cross-bar 41. At 58 is a bracket through which the shaft 57 passes and fixed to this shaft on top of the bracket 58 is a disk 59 having an arcuate channel 60 therein wherein is mounted a coiled compression spring 61. The bracket 58 has a finger 62 which extends into the channel 60 and bears against one end of the spring 61. Attached to the lever 44 is a strand 42, which runs over an idler pulley 64 and down to a pin 65, which passes through a bracket 66 and carries on its lower end a weight 67. Weight 67 is mounted between plates 68 secured by brackets 68*a* to any suitable support. A spring 68′ surrounds the pin 65 between the bracket 66 and the weight 67. This arrangement acts to normally keep the pair of members 40 in the normally open position of the jaws. Bands 68*b* surround plates 68 and weight 67 to hold the assembly together while permitting the weight 67 to slide between plates 68.

The preferred form of tank for use in connection with this invention is of any desired shape and size but has an outer layer 71, an inner layer 72 and an intermediate layer 73. The inner and outer layers are preferably formed of aluminum and the intermediate layer is of plastic material. Extending horizontally and transversely of the tank are perforated plates 74 which divide the tank into substantially cubes of 3 inches in each dimension, these being intercepted with other layers 75 for this purpose. Certain covered rods 76 are also provided to prevent bursting of the tank.

The means by which the jaws 13 are opened and closed is as follows: Attached to lever 53 is a latch pin 54 which is connected by a cable 51 to the lock pin 47. When the pin 47 is released by movement of lever 53 through cable 51, the jaws 13 will close as shown in Fig. 6. The jaws 13 may be opened again by reverse movement of lever 53. There is also a lead cable 37 extending to the jaws 13 and attached thereto in any suitable manner, as at 38, which controls the opening of the jaws 13. Pressure exerted by springs 28 (see Fig. 16), closes the jaws when lock pin 47 is released either by the lever 54 or the weight release 67. When the jaws have been opened the weight 67 serves to hold jaws 13 in open position.

The weight release 67 is attached to the lock release 68 by means of a cable 42 (see Fig. 11) and is so adjusted by the tension of springs 68 that it will normally not trip the lock pin 47 except in the case of a crash or heavy impact, in which case the impact transmitted through cable 42 will jar loose the pin 47 and jaws 13 will open.

The spring 61 is used to assist in the immediate movement of the arcuate members 40 about shaft 57 when the jaws 13 are being closed.

The point where the lever 53 is tied down is of such nature that this lever is moved freely; however, it is so adjusted as to remain in place when the outlet is opened or closed and is so indicated on the instrument.

While I have described the preferred embodiment of the invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What is claimed, is:

1. In a device of the kind described, a tank, a delivery pipe extending from said tank and having an open outlet end, a pair of normally spread jaws between which said pipe extends, said jaws being pivotally supported to clasp around the pipe and close its open end when subject to shock from accidents, a housing carried by said tank and enclosing said pipe and jaws, said housing being provided with a pipe connection having a valve seat, a normally open valve member coacting with said seat, and linkage connecting said valve member and jaws and acting to close the valve upon grasping movement of said jaws.

2. In a device of the kind described, a tank, a delivery pipe extending from said tank and having an open outlet end, a pair of normally spread jaws between which said pipe extends, said jaws being pivotally supported to clasp around the pipe and close its open end when subject to shock from accidents, a housing carried by said tank and enclosing said pipe and jaws, said housing being provided with a pipe connection having a valve seat, a normally open valve member coacting with said seat, linkage connecting said valve member and jaws and acting to close the valve upon grasping movement of said jaws, and spring means connected to said jaws and assisting gripping movement thereof.

3. In a device of the kind described, a tank, a delivery pipe extending from said tank and having an open outlet end, a pair of normally spread jaws between which said pipe extends, said jaws being pivotally supported to clasp around the pipe and close its open end when subject to shock from accidents, a housing carried by said tank and enclosing said pipe and jaws, said housing being provided with a pipe connection having a valve seat, a normally open valve member coacting with said seat, linkage connecting said valve member and jaws and acting to close the valve upon grasping movement of said jaws, spring means connected to said jaws and assisting gripping movement thereof, and pedal operated means connected to said jaws and causing spreading movement of said jaws upon actuation.

4. In a device of the kind described, a tank, a delivery pipe extending from said tank and having an open outlet end, and a pair of normally spread jaws between which said pipe extends, said jaws being pivotally supported to clasp around the pipe and close its open end when subject to shock from accidents, said jaws and pipe having coacting ribs and recesses coacting when the jaws grasp the pipe and preventing leakage between said pipe and jaws, a housing carried by said tank and enclosing said pipe and jaws, said housing being provided with a pipe connection having a valve seat, a normally open valve member coacting with said seat, and linkage connecting said valve member and jaws and acting to close the valve upon grasping movement of said jaws.

5. In a device of the kind described, a tank, a delivery pipe extending from said tank and having an open outlet end, and a pair of normally spread jaws between which said pipe extends, said jaws being pivotally supported to clasp around the pipe and close its open end when subject to shock from accidents, said jaws and pipe having coacting ribs and recesses coacting when the jaws grasp the pipe and preventing leakage between said pipe and jaws, a housing carried by said tank and enclosing said pipe and jaws, said housing being provided with a pipe connection having a valve seat, a normally open valve member coacting with said seat, linkage connecting said valve member and jaws and acting to close the valve upon grasping movement of said jaws, and spring means carried by said jaws.

6. In a device of the kind described, a tank, a delivery pipe extending from said tank and having an open outlet end, a pair of normally spread jaws between which said pipe extends, said jaws being pivotally supported to clasp around the pipe and close its open end when subject to shock from accidents, said jaws and pipe having coacting ribs and recesses coacting when the jaws grasp the pipe and preventing leakage between said pipe and jaws, a housing carried by said tank and enclosing said pipe and jaws, said housing being provided with a pipe connection having a valve seat, a normally open valve member coacting with said seat, linkage connecting said valve member and jaws and acting to close the valve upon grasping movement of said jaws, spring means connected to said jaws and assisting gripping movement thereof, and pedal operated means connected to said jaws and causing spreading movement of said jaws upon actuation.

References Cited in the file of this patent

UNITED STATES PATENTS

| | | |
|---|---|---|
| 149,430 | Bowen | Apr. 7, 1874 |
| 156,518 | Wight | Nov. 3, 1874 |
| 1,393,825 | Porharty | Oct. 18, 1921 |
| 2,603,237 | Van Hyning | July 15, 1952 |